US007241212B2

(12) United States Patent
Horst et al.

(10) Patent No.: US 7,241,212 B2
(45) Date of Patent: Jul. 10, 2007

(54) POULTRY INCAPACITATOR AND METHOD OF USE

(75) Inventors: Drew Horst, Lampe, MO (US); Edgar Garcia-Rill, Little Rock, AR (US)

(73) Assignee: Middleton, Inc., Hollister, MO (US)

( * ) Notice: Subject to any disclaimer, the term of this patent is extended or adjusted under 35 U.S.C. 154(b) by 0 days.

(21) Appl. No.: 11/184,939

(22) Filed: Jul. 19, 2005

(65) Prior Publication Data

US 2006/0135052 A1    Jun. 22, 2006

Related U.S. Application Data

(63) Continuation-in-part of application No. 11/026,932, filed on Dec. 31, 2004, now abandoned.

(60) Provisional application No. 60/533,489, filed on Dec. 31, 2003.

(51) Int. Cl.
*A22B 3/06* (2006.01)

(52) U.S. Cl. ...................................................... 452/58

(58) Field of Classification Search ............. 452/57–60
See application file for complete search history.

(56) References Cited

U.S. PATENT DOCUMENTS

| 1,599,134 | A | * | 9/1926 | King ............................. 452/54 |
| 4,153,971 | A | * | 5/1979 | Simonds ....................... 452/59 |
| 4,875,253 | A | * | 10/1989 | Lambooy ...................... 452/58 |
| 4,953,263 | A | * | 9/1990 | Lambooy ...................... 452/58 |
| 5,888,132 | A | * | 3/1999 | Burnett ....................... 452/141 |
| 5,899,802 | A | * | 5/1999 | Burnett ....................... 452/141 |
| 6,338,673 | B2 | * | 1/2002 | Berry et al. .................. 452/58 |
| 6,471,576 | B1 | * | 10/2002 | Ross ........................... 452/58 |

* cited by examiner

*Primary Examiner*—Thomas Price
(74) *Attorney, Agent, or Firm*—Lathrop & Gage, L.C.

(57) ABSTRACT

The invention relates to a method for rendering fowl insensate prior to killing and processing, by exposing the fowl to a radio frequency source producing a frequency from between approximately 5 GHz and approximately 40 GHz, with an average power density from between approximately 10 mW per square centimeter and approximately 100 mW per square centimeter, for a predetermined period of time.

20 Claims, 3 Drawing Sheets

POULTRY INCAPACITATOR AND METHOD OF USE

RELATED APPLICATION

This application is a continuation-in-part and claims priority to 11/026,932, filed Dec. 31, 2004 now abandoned, which claims priority to 60/533,489 filed Dec. 31, 2003. The aforementioned applications are incorporated by reference herein.

FIELD OF THE INVENTION

The present invention relates generally to poultry processing, and in particular to a device and method utilizing radio frequencies (microwaves) for incapacitating poultry prior to decapitation, slaughter by other methods, or during the processing of the poultry, for example during feather removal.

BACKGROUND OF THE INVENTION

Humane treatment of animals prior to processing for food purposes has long been an important issue to animal rights groups, government agencies and consumers. Automated equipment has been developed to speed the processes used for killing and processing animals in commercial settings. This is particularly the case in poultry processing facilities where animals are typically suspended from a shackle line or similar conveyance assembly and mechanically transported through each of the processing steps.

Historically, animals were "live killed" meaning that they were not stunned or incapacitated in any manner. Because rendering an animal unconscious or otherwise incapacitating it prior to killing makes processing easier and clearly more humane, a variety of devices and methods have been developed to facilitate this processing step. Examples of methods commonly employed to render animals insensate include gassing, chemical exposure, electric shock, and blunt force. Each of these methods have problems, including a relatively high incidence of failure in that not all of the animals are successfully incapacitated, and some are actually killed or wounded by the incapacitation process. Moreover, each of these methods may result in damaging some of the animals to an extent that would cause them to be unfit for human consumption. The known methods can result in lost profits for the processor due to rework, downgrading or outright loss of product.

A stated goal within the poultry processing industry is that a minimum of 98 percent of birds be effectively stunned, with the bird being rendered insensate, at the time of killing. Achieving this goal utilizing known and existing methods is extremely difficult if not impossible.

It is therefore desirable to provide an effective, safe and humane method for incapacitating animals, particularly poultry, prior to slaughter. The instant invention overcomes the limitations and problems particular to the previously known methods, as identified above and commonly known in the industry.

BRIEF DESCRIPTION OF THE DRAWING

The invention is illustrated using the following figures along with the detailed description of the invention.

DETAILED DESCRIPTION OF THE INVENTION

The present invention relates to a new device and method or process for incapacitating or stunning animals prior to killing during the slaughtering process.

Figure 1:
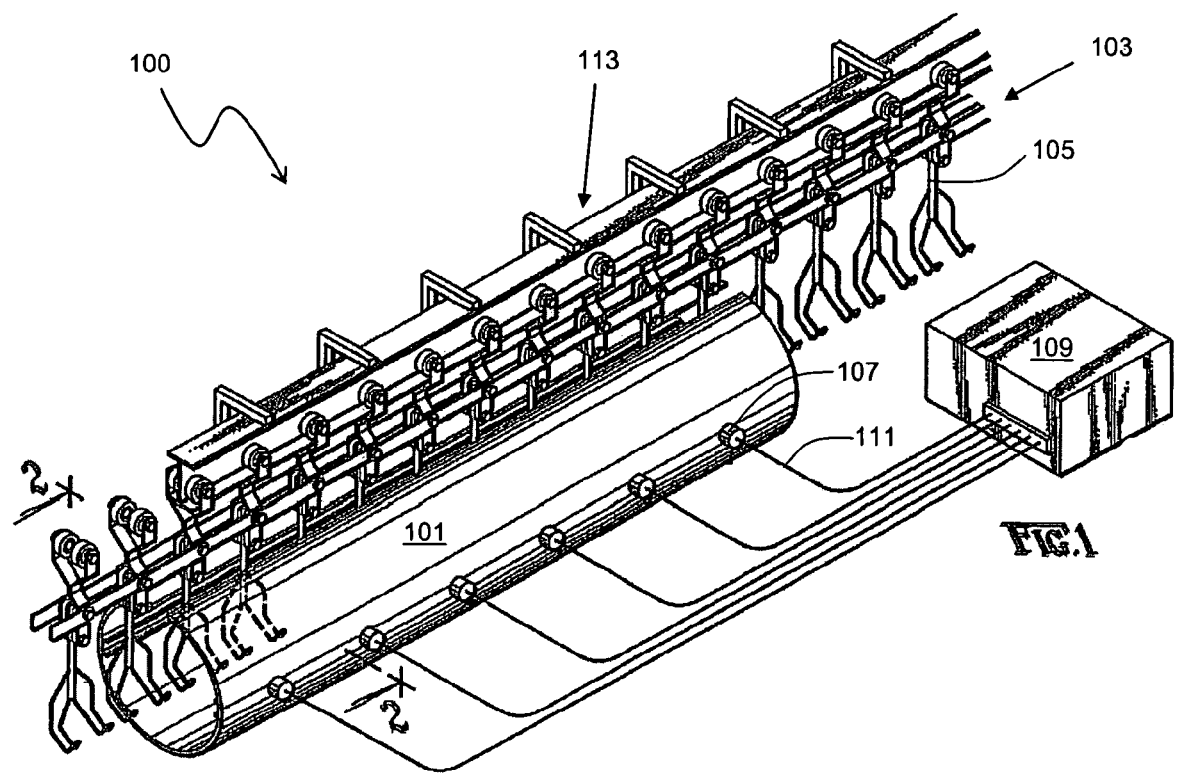
FIG. 1 is a perspective view of a poultry incapacitator, according to an embodiment.

Referring generally now to FIG. 1, a poultry incapacitator 100 is presented. In this particular embodiment, microwave radio frequency signals are transmitted along field guiding structures, e.g. structure 101, which limit the signal transmission range. Exposure of poultry to specific radio frequencies over a period of time will render the animal insensate. In at least one embodiment, the field guiding structure 101 is a metallic cylinder or tube. The tube may be either fully or partially closed. In yet another embodiment, the field guiding structure 101 includes a plurality of parallel guiding plates (not shown). In at least one embodiment, field guiding structure 101 is constructed from a highly conductive metal. It may be necessary to curve the sides of field guiding structure 101, dependent upon the parameters of the power generation, exposure time, and the like discussed below. In one embodiment, field guiding structure 101 is either coated with an easily cleaned surface or provided with a shield that can be removed for cleaning.

Figure 2:
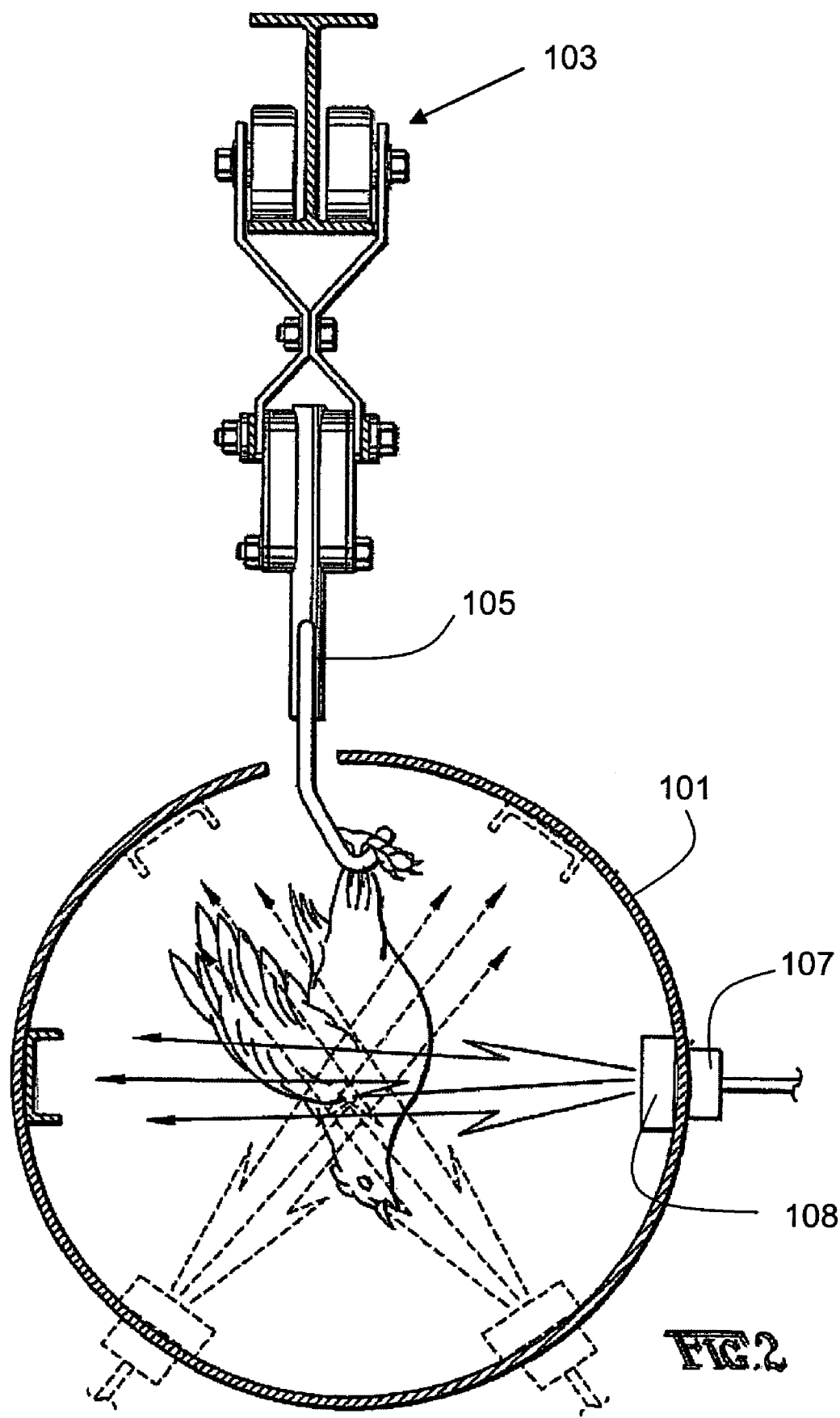
FIG. 2 is a cross sectional view taken along line 2—2 of FIG. 1.

Integrated with the field guiding structure 101 is a shackle line 103. In particular, shackle line 103 is positioned such that movement along shackle line 103 transports shackled poultry through field guiding structure 101 at a predetermined rate. Cross-referencing for a moment FIG. 1 with FIG. 2, animals (poultry) are suspended upside down by any of a number of retaining or shackling devices 105 well known in the art, and are conveyed along shackle line 103 with their bodies passing through field guiding structure 101.

A radio frequency coupling trough 107, through which RF (radio frequency) signals can be coupled into field guiding structure 101, may use antennas, apertures, probes, wires, or other methods commonly practiced in the art of microwave RF design for concentrating an RF signal or RF field, and reducing power requirements. A plurality of troughs 107 are positioned longitudinally along the length of field guiding structure 101, as shown in FIG. 1. In at least one embodiment, troughs 107 are mounted through apertures in one or more parallel guiding plates. These troughs 107 are connected to a source 109 of the RF signals through guiding structures that are known as waveguides, of which waveguide 111 is exemplary. In yet another embodiment, other well known structures available for guiding electromagnetic waves at the frequencies described below may be used. It may be beneficial to place a cylindrical resonator (not shown) within the field guiding structure 101 prior to passing a radio frequency along structure 101, to decrease the required operational power. Further, a single radio frequency transmitter 108 (FIG. 2) may be used in conjunction with a microwave power splitter (not shown) to convey power through a given trough 107. An overhead conveying system 113, which includes shackle line 103, is grounded to field guiding structure 101 to prevent electrical arcing which would result in undesired heating of the conveying system 113.

The RF power may be supplied by a klystron, magnetron, or similar device (not shown) consistent with the peak power rating, pulse repetition frequency, duty cycle and RF frequency required by incapacitator 100. A frequency range of from between 5 (gigahertz) GHz to 40 GHz can operatively incapacitate the fowl, depending on power density. In at least one embodiment, the RF frequency is approximately 16 GHz, which is typical of Ku band microwave applications. The peak power rating is in the range of 10 kilowatts (kW) to 100 kW. In one embodiment, the optimum peak power rating is 60 kW, with an average power in the range of 20 W to 200 W, preferably 100 W. It is understood that power ratings may differ depending on the usable configuration of the RF power supply. Typically, the pulse frequency will be approximately 8400 Hz (+/−) 2500 Hz, with a pulse duration of approximately 0.20 microseconds. This is commensurate with a duty cycle of approximately 0.2%.

Magnetron tubes consistent with the above specifications are commercially available and are manufactured, for example, by CPI Wireless Solutions of Beverly, Mass. An exposure energy density of between 150 milliwatts (mW) seconds per square centimeter and 350 mW seconds per square centimeter is sufficient to produce some observable effect in the animals at a power density of 45 mW per square centimeter. The exposure time at this power level is in the range of 3 to 30 seconds, but should render the animal insensate in approximately 2 to 10 seconds.

In one embodiment of the inventive method, the following parameters are specified: a radio frequency from between approximately 5 GHz and approximately 40 GHz, with an average power density from between approximately 10 mW per square centimeter and approximately 100 mW per square centimeter, produced and concentrated within and/or around a field guiding structure, such as field guiding structure 101. An animal's, e.g. poultry, complete body is then exposed to the radio frequency by placing the animal's head adjacent to or within field guiding structure 101 for a period of time from between approximately 3 seconds and approximately 30 seconds. In at least one embodiment, the radio frequency is produced from a magnetron operable within the Ku band. In a second embodiment, the head of the standing, shackled and/or conveyed animal is exposed from above or from the sides with similar effects. In those cases in which repeated exposure is desired, the waveguides, e.g. waveguide 111, can be split to provide RF at multiple points along field guiding structure 101, or multiple magnetrons can be used in series to provide RF exposure at multiple points along field guiding structure 101.

Figure 3:
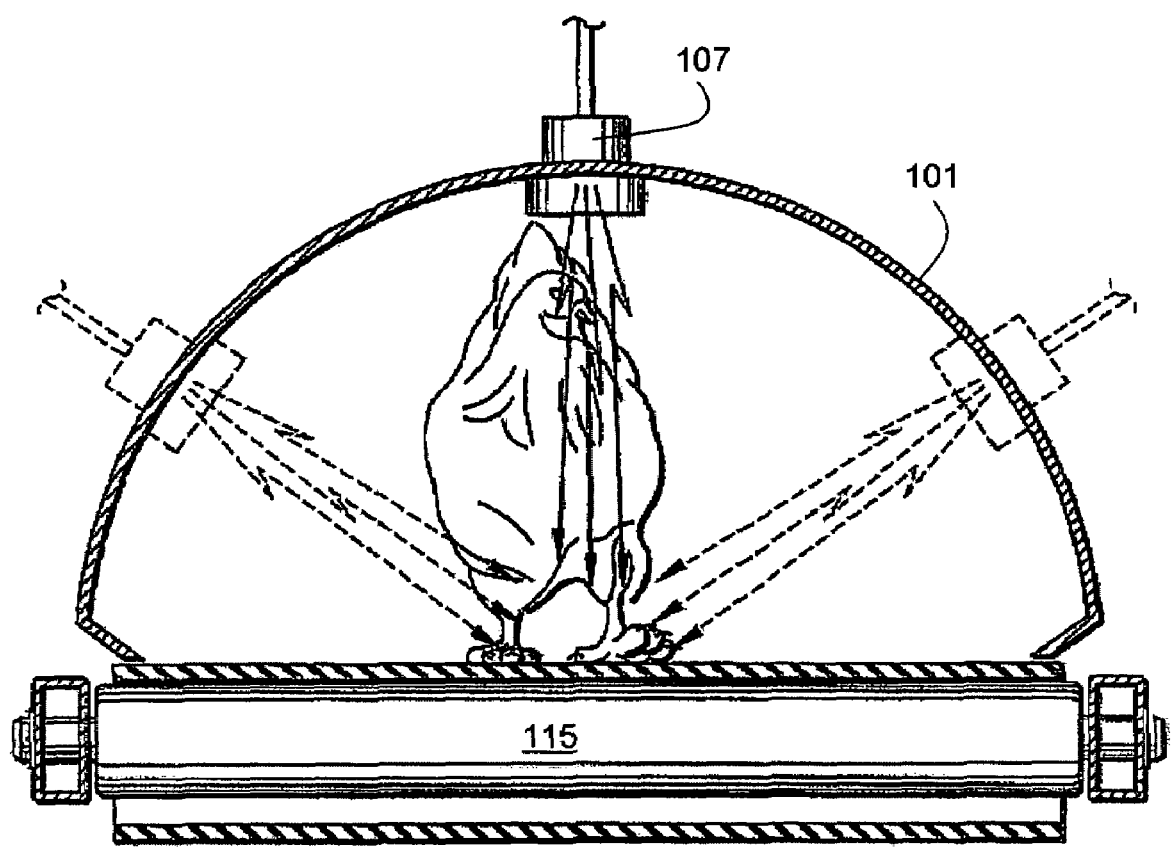
FIG. 3 is a cross section view, according to an embodiment, of a roller belt assembly for conveyance of the poultry.

In another embodiment, as shown in FIG. 3, the same method or process of exposing the animal's body to RF is used while the animals are standing or resting on a surface, such as a conveyor 115, with the RF signals transmitted generally downward towards the head or from the side towards the body and head. Conveyor 115 may be a roller belt assembly or other conveyor system well known in the art.

It will be apparent to those skilled in the art that various modifications and variations can be made in the system and method of the present invention without departing from the spirit or scope of the invention. The present invention covers the modifications and variations of this invention provided they come within the scope of the appended claims and their equivalents.

What is claimed is:

1. A method for incapacitating a fowl comprising the step of exposing the fowl to a radio frequency, wherein the radio frequency is between approximately 5 GHz and approximately 40 GHz, with an average power density from between approximately 10 mW per square centimeter and approximately 100 mW per square centimeter.

2. The method of claim 1, further comprising exposing the fowl to the radio frequency for between approximately 3 seconds and approximately 30 seconds.

3. The method of claim 1, further comprising directing the radio frequencies at a head of the fowl.

4. The method of claim 1, further comprising concentrating the radio frequencies within and surrounding a field guiding structure.

5. The method of claim 4, further comprising concentrating the radio frequencies between parallel guiding plates and nearby surrounding space.

6. The method of claim 1, wherein a source of the radio frequency is a magnetron.

7. The method of claim 6, further comprising generating frequencies within the Ku band.

8. A method for incapacitating a fowl comprising the steps of:
generating a radio frequency from between approximately 5 GHz and approximately 40 GHz, with an average power density from between approximately 10 mW per square centimeter and approximately 100 mW per square centimeter;
directing the radio frequency along at least one field guiding structure; and
exposing a body of the fowl to the radio frequency by placing the body adjacent the at least one field guiding structure for a period of time from between approximately 3 seconds and approximately 30 seconds.

9. The method of claim 8, wherein the at least one field guiding structure comprises:
a metallic tube;
a plurality of radio frequency coupling troughs positioned along a length of the metallic tube; and
at least one device for concentrating the radio frequency and reducing required power levels, the device selected from a group including:
wires, probes, posts, and antennas.

10. The method of claim 9, further comprising placing a cylindrical resonator within the metallic tube prior to directing the radio frequency along the tube.

11. An incapacitator, comprising:
at least one field guiding structure; and
a radio frequency source connected to the at least one field guiding structure to limit the spatial range of a radio frequency field, the radio frequency source generating the radio frequency field from between approximately 5 GHz and approximately 40 GHz, with an average power density from between approximately 10 mW per square centimeter and approximately 100 mW per square centimeter, wherein an animal is rendered insensate by placing the animal in close proximity to the field guiding structure for a predetermined period of time.

12. The incapacitator of claim 11, wherein the at least one field guiding structure further comprises a plurality of parallel guiding plates.

13. The incapacitator of claim 12, further comprising at least one radio frequency coupling trough mounted through an aperture formed in at least one of the parallel guiding plates.

14. The incapacitator of claim 13, further comprising:
a plurality of apertures formed in at least one of the parallel guiding plates;
a plurality of troughs, each trough mounted through a corresponding aperture; and
at least one radio frequency transmitter provided at each trough.

15. The incapacitator of claim 14, further comprising at least one microwave power splitter.

16. The incapacitator of claim 12, further comprising a conveying system for suspending and conveying an animal with its body oriented between the parallel guiding plates, wherein the conveying system moves the animal at a predetermined rate of speed to achieve a desired exposure time to the radio frequency.

17. The method of claim 16, further comprising a shackle line.

18. The incapacitator of claim 11, wherein the radio frequency source is a magnetron.

19. The incapacitator of claim 11, wherein the predetermined period of time is between approximately 3 seconds and approximately 30 seconds.

20. A method for incapacitating poultry comprising:
positioning a poultry upright on a conveyor, the body of the poultry oriented between parallel guiding plates; and conveying the upright poultry at a predetermined rate of speed to achieve a desired exposure time to a radio frequency, wherein the frequency is within the range from between approximately 5 GHz and approximately 40 GHz, having an average power density from between approximately 10 mW per square centimeter and approximately 100 mW per square centimeter.

* * * * *

UNITED STATES PATENT AND TRADEMARK OFFICE
CERTIFICATE OF CORRECTION

| | |
|---|---|
| PATENT NO. | : 7,241,212 B2 |
| APPLICATION NO. | : 11/184939 |
| DATED | : July 10, 2007 |
| INVENTOR(S) | : Drew Horst and Edgar Garcia-Rill |

It is certified that error appears in the above-identified patent and that said Letters Patent is hereby corrected as shown below:

Title page, line 2 of Item (63), "now abandoned" should read --now U.S. Pat. No. 7,244,172--;
Column 1, line 2, "now abandoned" should read --now U.S. Pat No. 7,244,172--;

Signed and Sealed this

First Day of April, 2008

JON W. DUDAS
*Director of the United States Patent and Trademark Office*